Patented Apr. 5, 1927.

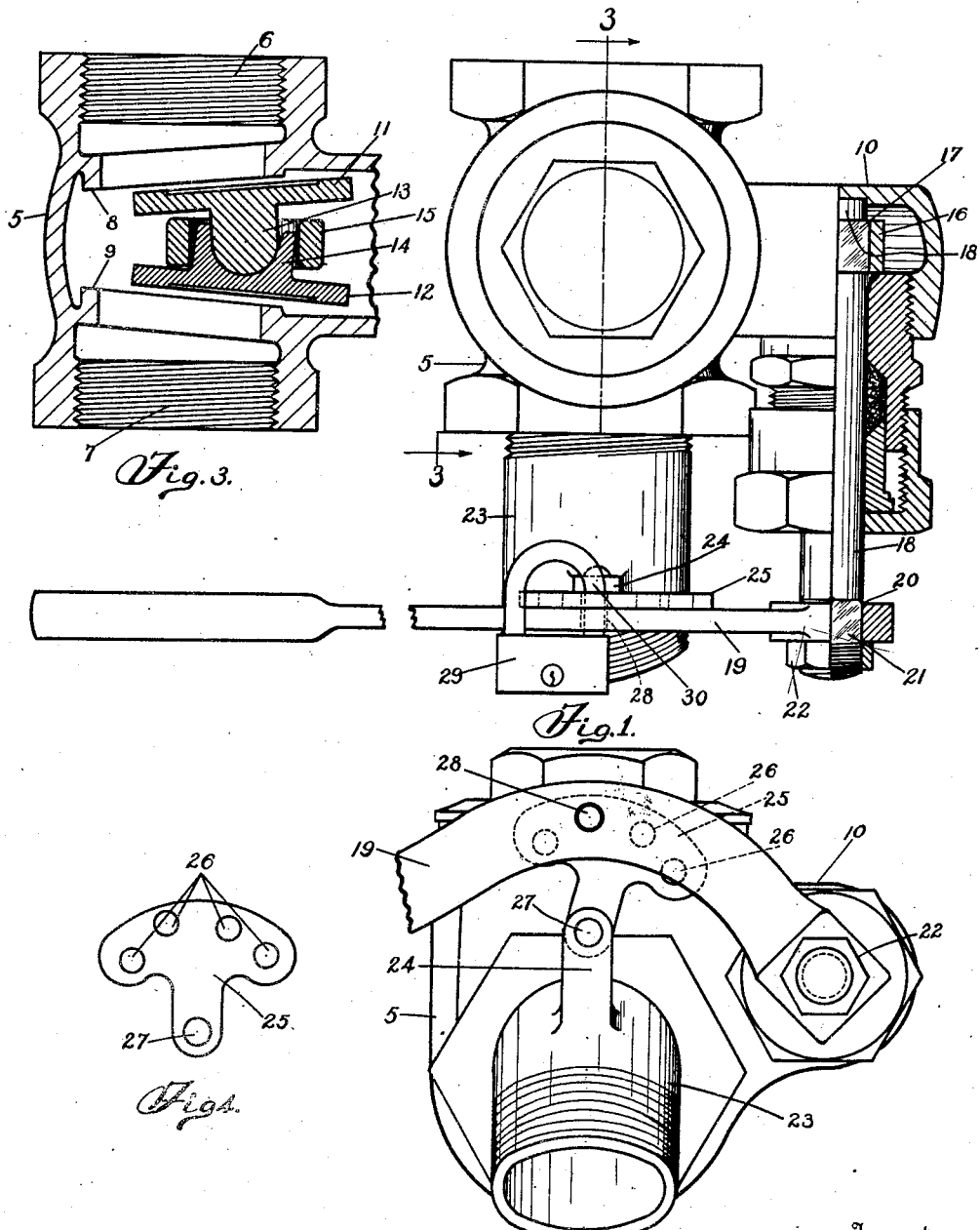

1,623,867

UNITED STATES PATENT OFFICE.

HARRY J. ERNST, OF CINCINNATI, OHIO, ASSIGNOR TO THE D. T. WILLIAMS VALVE COMPANY, OF CINCINNATI, OHIO, A CORPORATION OF OHIO.

VALVE STRUCTURE AND LOCKING DEVICE.

Application filed February 27, 1925. Serial No. 12,120.

This invention relates to valves such as are used in connection with gasoline dispensing pumps and tanks and has for an object the provision of a locking means for throttle valves such as are used in connection with dispensing devices of the class mentioned. Valves of the type required for these devices must be adapted to permit a rapid flow of gasoline or like fluid therethrough and, by reason of the aptness of gasoline to leak through ordinary quick closing valves, must be provided with a variable seating surface in order to automatically provide for wear and to always have a complete closure for the valve. In some dispensing devices using this type of valve there is always a quantity of gasoline remaining under the control of such valve and it has been found that unauthorized persons will drive up to such dispensing apparatus after the proper attendant has left and manipulate the throttle valve sufficiently to drain out the said remaining quantity of gasoline. My reason of the varying limits of movement of the valve lever it has heretofore been impossible to effectively lock the valve lever against manipulation in order to prevent the surreptitious theft of gasoline from the dispensing apparatus during the night time.

An object of my invention is to provide a locking means for gasoline valves and the like.

Another object is to provide means of this type which will accommodate itself to conditions of wear in the valve.

Another object is to provide a device of this kind which will preclude movement of the valve lever when locked and it will preclude movement thereof in spite of partial dismantling of the valve structure.

These and other objects are attained by the means described herein and disclosed in the accompanying drawings, in which:

Fig. 1 is a side elevational view of a gasoline throttle valve having a locking means of my invention embodied therein.

Fig. 2 is an end view of the device shown in Fig. 1.

Fig. 3 is a cross sectional view on line 3—3 of Fig. 1, showing the valve in a partly open position.

Fig. 4 is a detail view of a locking plate forming a part of my invention.

The throttle valve as shown in Figs. 1, 2 and 3 of the drawings comprises a casing 5 having an inlet port 6 and an outlet port 7 and provided interiorly with a pair of spaced converging valve seats 8 and 9. The casing 5 is also provided with a communicating off set housing 10 wherein the valve operating mechanism is contained. The valve for controlling communication between the ports 6 and 7 comprises a pair of swivel valve members 11 and 12, for seating upon the valve seats 8 and 9 respectively. The valve 11 comprises a disc portion having a rounded or ball memer 13 while the valve 12 comprises a similar disc provided with a socket member 14 for receiving the ball member 13 of the valve 11. As will be readily apparent from Fig. 3 the faces of the valves 11 and 12 will freely accommodate themselves to the valve seats 8 and 9 regardless of the wear of the valve seats. A suitable yoke member 15 encircles the ball and socket portion of the valves and is provided with a suitable socket 16 (see Fig. 1) for receiving an angular shoulder portion 17 of an actuating shaft 18. A valve lever 19 is provided with a suitable angular aperture 20 for receiving a shouldered portion 21 of the actuating shaft 18 and may be secured against displacement by means of a nut 22. A coupling member 23 which is screw threaded into the outlet port 7 of the casing 5, carries integral perforate lugs 24 on the side adjacent the valve lever 19 which have a locking plate 25 pivotally mounted between them. The locking plate 25 is provided with a plurality of perforations 26 spaced at varying distances from the center of its pivotal mounting which is located in the center of the perforation 27. The valve lever 19 is provided with a single perforation 28 which, when said lever is moved to close the valves 11 and 12, will be capable of registry with one of the perforations 26.

As will be readily apparent from Fig. 3, the valves 11 and 12 will move farther in the direction of convergence of the valve seats 8 and 9 as the said seats become worn so that the yoke 15, shaft 18 and valve lever 19 will also be capable of a like amount of movement. The valves 11 and 12 and their complementary swivel portions 13 and 14 provide a wedge like closing means which is adapted to firmly seat itself between the valve seats 8 and 9, the swivel relation of the parts causing the wedging action to distribute itself evenly over both valve seats.

By reference to Figs. 2 and 4 it will be apparent that the various perforations 26, being located on varying radii from the center of the perforation 27 will be capable of registry with the perforation 28 in the valve lever 19 at different times during the life of the valve, and that the perforation 26 which is spaced at the greatest distance from the center of perforation 27 will register with the perforation 28 in the valve lever 19 when the valve is new. A suitable staple lock 29 may have one of its arms 30 inserted through the registering perforations 26 and 28 in the locking plate 25 and valve lever 19 respectively for locking the lever against movement. It should be noted that even though the nut 22 be removed from the shaft 18 that it would be impossible to effect any movement of said shaft for opening the valve since the socket portion 20 of the lever 19 and the locked relation of the lever and locking plate preclude removal of the lever. As the valves 11 and 12 and valve seats 8 and 9 become worn, one of the perforations 26 spaced at a lesser distance from the perforation 27, will be adapted to register with the perforation 28 in the lever and in this way it will be possible to positively lock the lever against any movement regardless of the amount of wear which has taken place upon the valves and valve seats. It should be noted that it is essential to provide further locking of the lever during all conditions of wear of the valve for the reason that valves of this type are adapted to normally permit a very rapid flow of gasoline therethrough and that even a slight movement of the valves upon their seats may permit a fairly rapid flow of fluid through said valve.

What I claim is:

1. In a device of the class described the combination with a valve casing, of a valve in the casing and means for actuating the valve comprising a lever having a perforation therethrough, and a locking plate pivotally mounted upon the casing and having a series of perforations therethrough spaced at various distances from the pivotal mounting of said plate, the perforation in the lever being adapted to register with one of the perforations in the locking plate for receiving a staple lock whereby the valve lever and valve are locked against movement.

2. In a device of the class described the combination with a valve casing, of a pair of spaced inclined valve seats in the casing, a pair of swiveled valves mounted for sliding and wedging movement between the valve seats for controlling a flow of fluid through the valve, a valve lever for controlling movement of the valve and adapted to be moved toward and away from the casing for seating and unseating the valves, the lever being adapted to have a varying limit of movement for closing the valve, and a locking plate pivotally mounted upon the casing and provided with a plurality of perforations located at various distances from the center of its pivotal mounting for receiving a locking means whereby the lever may be locked at its various limits of movement.

3. In a device of the class described the combination of a valve casing, a wedge shaped valve and valve seats therefor in the casing, a perforate actuating lever for the valve, said lever and valve being adapted to assume progressively advanced closing positions as the valve and valve seat wear away in use, and a locking plate pivotally mounted on the casing and having a series of perforations spaced at different distances from the pivotal mounting of said plate, the perforation in the lever being adapted to register with different ones of the perforations in the plate as the lever assumes different closed positions for receiving a lock.

In testimony whereof, I have hereunto subscribed my name this 25th day of February, 1925.

HARRY J. ERNST.